US012635034B2

(12) United States Patent
Xu et al.

(10) Patent No.:     US 12,635,034 B2
(45) Date of Patent:     **\*May 19, 2026**

(54) DISCONTINUOUS RECEPTION TRANSMISSION

(71) Applicant: Apple Inc., Cupertino, CA (US)

(72) Inventors: Fangli Xu, Beijing (CN); Chunhai Yao, Beijing (CN); Dawei Zhang, Saratoga, CA (US); Haijing Hu, Los Gatos, CA (US); Naveen Kumar R. Palle Venkata, San Diego, CA (US); Pavan Nuggehalli, San Carlos, CA (US); Ralf Rossbach, Munich (DE); Sarma V. Vangala, Campbell, CA (US); Sethuraman Gurumoorthy, San Ramon, CA (US); Yuqin Chen, Beijing (CN); Zhibin Wu, Los Altos, CA (US)

(73) Assignee: Apple Inc., Cupertino, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/476,606

(22) Filed: Sep. 28, 2023

(65) Prior Publication Data

US 2024/0023197 A1      Jan. 18, 2024

Related U.S. Application Data

(63) Continuation of application No. 17/593,733, filed as application No. PCT/CN2021/111060 on Aug. 5, 2021.

(51) Int. Cl.
H04L 1/1829          (2023.01)
H04L 1/1812          (2023.01)
(Continued)

(52) U.S. Cl.
CPC ........... *H04W 76/28* (2018.02); *H04L 1/1812* (2013.01); *H04L 1/1848* (2013.01); *H04W 4/06* (2013.01); *H04W 72/232* (2023.01)

(58) Field of Classification Search
CPC ..... H04W 76/28; H04W 4/06; H04W 72/232; H04W 72/30; H04W 76/11; H04W 76/15;
(Continued)

(56)          References Cited

U.S. PATENT DOCUMENTS

2022/0159417 A1\*   5/2022   Zhou ..................... H04W 72/23
2023/0040690 A1    2/2023   Chen et al.

FOREIGN PATENT DOCUMENTS

EP          4030867 A1 \*   7/2022   ............... H04L 1/08
EP          4136794         2/2023
(Continued)

OTHER PUBLICATIONS

Oppo, "Discussion on group-based scheduling for MBS", 3GPP TSG-RAN WG2 Meeting #114 electronic, R2-2104938, May 11, 2021, 9 sheets.

*Primary Examiner* — Joseph E Dean, Jr.
(74) *Attorney, Agent, or Firm* — Fay Kaplun & Marcin, LLP

(57)          ABSTRACT

Embodiments of the present disclosure relate to discontinuous reception (DRX) transmission. Embodiments of the present disclosure propose a solution for DRX configurations for point-to-point (PTP) and/or point-to-multipoint (PTM) transmissions. In this solution, a user equipment (UE) maintains separate DRX configurations for PTP transmissions and PTM transmissions. During active time for the PTP transmissions, the UE monitors physical downlink control channel (PDCCH) with a UE specific identifier. The UE monitors PDCCH with a PTM transmission specific identifier during active time for the PTM transmissions. In
(Continued)

this way, it can match the MBS service quality mechanism. Moreover, it also saves power at the UE.

20 Claims, 9 Drawing Sheets

(51) Int. Cl.
    *H04L 5/00*          (2006.01)
    *H04W 4/06*         (2009.01)
    *H04W 72/232*     (2023.01)
    *H04W 76/28*      (2018.01)

(58) Field of Classification Search
    CPC ... H04L 1/1812; H04L 1/1848; H04L 5/0055;
                            H04L 5/0053; Y02D 30/70
    See application file for complete search history.

(56) References Cited

FOREIGN PATENT DOCUMENTS

| | | | | |
|---|---|---|---|---|
| EP | 4201142 | | 6/2023 | |
| EP | 4277193 | A2 * | 11/2023 | ........... H04L 1/1812 |
| WO | 2018/058586 | | 4/2018 | |
| WO | 2020/167896 | | 8/2020 | |
| WO | 2022/099181 | | 5/2022 | |
| WO | WO-2022099181 | A2 * | 5/2022 | ........... H04L 1/1851 |
| WO | 2022/133358 | | 6/2022 | |

* cited by examiner

300

1000

1100

DISCONTINUOUS RECEPTION TRANSMISSION

TECHNICAL FIELD

Embodiments of the present disclosure generally relate to the field of telecommunications, and in particular, to discontinuous reception (DRX) transmission.

BACKGROUND

With developments of communication technologies, a technology named "DRX" has been proposed in order to save power. DRX is a technique that allows a User Equipment (UE) to turn off its transceiver for a duration of a DRX cycle when there are no packets to be received. In other words, within such duration, the UE does not need to receive the packet and does not performing monitoring on channels. Moreover, Multicast and Broadcast Service (MBS) has been proposed to make it possible for efficient use of radio and network resources while transmitting audio and video content to a large group of end users. The term "MBS" used herein refers to a point-to-multipoint communication scheme where data packets are transmitted simultaneously from a single source to multiple destinations.

SUMMARY

In general, example embodiments of the present disclosure provide a solution for DRX transmission.

In a first aspect, there is provided a user equipment. The user equipment comprises a transceiver and a processor. The transceiver is configured to communicate with a network. The processor is communicatively coupled to the transceiver and configured to perform operations comprising: receiving, from a base station, a first configuration of discontinuous reception (DRX) which is for maintaining a first active time for a point-to-point (PTP) transmission; receiving, from the base station, a second configuration of DRX which is for maintaining a second active time for a point-to-multipoint (PTM) transmission; monitoring a first physical downlink control channel (PDCCH) with a first identifier which is specific to the UE based on the first active time; and monitoring a second PDCCH with a second identifier which is specific to the PTM transmission based on the second active time.

In a second aspect, there is provided a user equipment. The user equipment comprises a transceiver and a processor. The transceiver is configured to communicate with a network. The processor is communicatively coupled to the transceiver and configured to perform operations comprising: receiving, from a base station, a first configuration of discontinuous reception (DRX) which is for maintaining a first common active time; and monitoring a first physical downlink control channel (PDCCH) with a first identifier specific to the UE and a second PDCCH with a second identifier specific to a point-to-multipoint (PTM) transmission based on the first common active time.

In a third aspect, there is provided a processor of a user equipment (UE). The processor of the UE is configured to perform operations comprising: receiving, from a base station, a first configuration of discontinuous reception (DRX) which is for maintaining a first active time for a point-to-point (PTP) transmission; receiving, from the base station, a second configuration of DRX which is for maintaining a second active time for a point-to-multipoint (PTM) transmission; monitoring a first physical downlink control channel (PDCCH) with a first identifier which is specific to the UE based on the first active time; and monitoring a second PDCCH with a second identifier which is specific to the PTM transmission based on the second active time.

In a fourth aspect, there is provided a processor of a user equipment (UE). The processor of the UE is configured to perform operations comprising: receiving, from a base station, a first configuration of discontinuous reception (DRX) which is for maintaining a first common active time; and monitoring a first physical downlink control channel (PDCCH) with a first identifier specific to the UE and a second PDCCH with a second identifier specific to a point-to-multipoint (PTM) transmission based on the first common active time.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
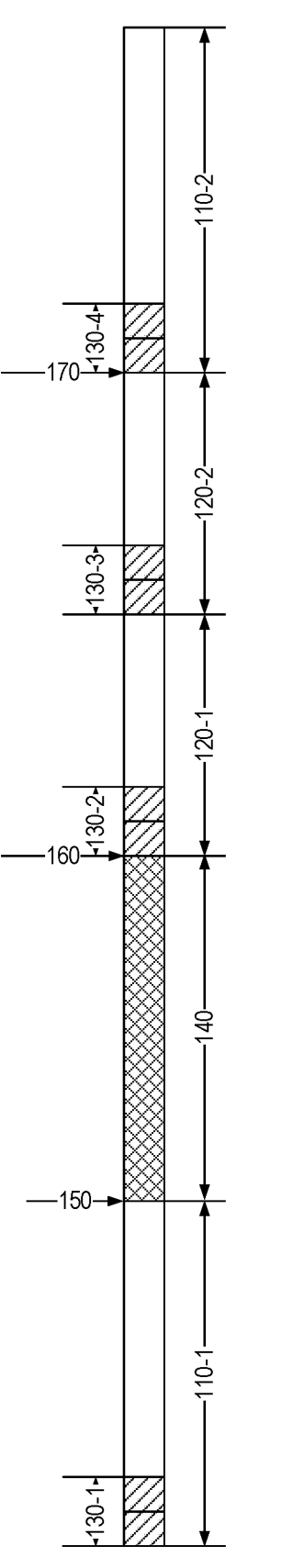
FIG. 1 illustrates a schematic diagram of a DRX configuration according to conventional technologies.

Principles of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The terminology used herein is for the purpose of describing particular embodiments only and is not intended to be limiting of example embodiments. For example, as used herein, the singular forms "a", "an" and "the" are intended to include the plural forms as well, unless the context clearly indicates otherwise. The terms "comprises", "comprising", "has", "having", "includes" and/or "including", when used herein, specify the presence of stated features, elements, and/or components etc., but do not preclude the presence or addition of one or more other features, elements, components and/or combinations thereof. Moreover, when a particular feature, structure, or characteristic is described in connection with some embodiments, it is submitted that it is within the knowledge of one skilled in the art to affect such feature, structure, or characteristic in connection with other embodiments whether or not explicitly described.

It is also to be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As mentioned above, technologies of DRX transmissions and MBS have been proposed. Moreover, when the UE is in a radio resource control (RRC)_CONNECTED mode, the UE can receive broadcast/multicast service. The broadcast/multicast service can be transported in a point-to-point (PTP) mode or a PTM mode. It is also proposed to enable the reception of Point to Multipoint transmissions by UEs in RRC_IDLE/RRC_INACTIVE states, with the aim of keeping maximum commonality between RRC_CONNECTED state and RRC_IDLE/RRC_INACTIVE state for the configuration of PTM reception. The term "PTP transmission" used herein can refer to a transmission from one device to a specific device. The term "PTM transmission" used herein can refer to a transmission from one device to multiple devices.

Further, the network needs to configure one or more MBS radio bearers (MRBs). There are three bearer types. For example, the MRB may be configured with a PTP only leg. Alternatively, the MRB may be configured with a PTP only leg. The network may configure a split-MRB with both a PTM leg and a PTP leg. For PTP transmissions, the transmission can be via UE dedicated scheduling. In this case, the transmission may be scheduled with PDCCH with a UE specific identifier, for example, a cell radio network temporary identifier (C-RNTI). Regarding PTM transmissions, the transmission can be via group scheduling, and the transmission can be scheduled using PDCCH with a MBS session specific identifier, for example, a group-RNTI (G-RNTI). Further, for a hybrid automatic repeat request (HARQ) retransmission, it may be scheduled via the PTM channel or via the PTP channel. In other words, the retransmission can be scheduled as a unicast transmission.

The network may transmit a DRX configuration to the UE. After the UE is configured with DRX, the UE does not need to continuously monitor PDCCH. The DRX configuration may indicate on-duration for the DRX. The term "on-duration" used herein can refer to a duration that the UE waits for, after waking up, to receive PDCCHs. If the UE successfully decodes a PDCCH, the UE stays awake and starts an inactive timer. The inactive timer can also be included in the DRX configuration. The term "inactivity timer" used herein can refer to a timer where before an expiration of the timer, the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions). The DRX configuration can also indicate a retransmission-timer. The term "retransmission timer" used herein can refer to a duration until a retransmission can be expected. A DRX cycle can also be included in the DRX configuration. The term "DRX cycle" used herein can specify a periodic repetition of the on-duration followed by a possible period of inactivity. The DRX configuration may indicate active time. The term "active time" used herein can refer to a total duration that the UE monitors PDCCH. The "active time" includes the "on-duration" of the DRX cycle, the time UE is performing continuous reception while the inactivity timer has not expired, and the time when the UE is performing continuous reception while waiting for a retransmission opportunity. The active time may also include following periods for uplink scheduling: (1) if a scheduling request is sent on a physical uplink control channel (PUCCH) and is pending; (2) during contention based random access (CBRA), after UE receives Msg2 but not receiving a new dedicated UL grant. Further, if UE is not in active time, UE will not report channel state information (CSI) on PUCCH and semi-persistent CSI on PUSCH. The UE will also not transmit a periodic sounding reference signal (SRS) and a semi-persistent SRS.

FIG. 1 shows a schematic diagram of a DRX configuration according to conventional technologies. As shown in FIG. 1, a long DRX cycle 110-1 comprises an on-duration 130-1 within which the UE waiting for PDCCH. If the UE successfully decodes the PDCCH, the UE can start an inactivity timer. If a scheduling message is received at a time instant 150, the UE may perform continuous receptions within the duration 140. If an inactivity-timer expires at a time instant 160 and the UE is configured with a short DRX cycle, the UE may switch to the short DRX mode. Alternatively, if a medium access control control element (MAC CE) is received at the time instant 160, the UE may switch to the short DRX mode. As shown in FIG. 1, the short DRX cycle 120-1 comprises an on-duration 130-2 within which the UE waiting for PDCCH and the short DRX cycle 120-2 comprises an on-duration 130-3. If a short DRX cycle timer expires at a time instant 170, the UE may go to the long DRX cycle mode. The long DRX cycle 110-1 comprises the on-duration 130-4. For example, as shown in FIG. 1, the active time may comprise the on-duration 130-1 and a duration of the inactivity timer which at least includes the duration 140.

Conventionally, the UE in RRC_CONNECTED has the DRX configuration and maintains the DRX mechanism per CG (cell group). For example, UE maintains one active time per CG. During the active time, UE monitors the UE dedicated scheduling, i.e. PDCCH with the UE specific RNTI. For the MBS PTM transmission, the transmission is scheduled to a group of UEs and the scheduled RNTI (G-RNTI) is not a UE specific RNTI. Regarding a potential HARQ retransmission, it may be scheduled via C-RNTI. If split MRB is configured for the transmission, it's up to network implementation to deliver the MBS data via PTP or PTM transmission. For MRB transmission via the PTP link, the network may schedule the MBS transmission via the PDCCH with C-RNTI.

In some situations, the MBS traffic pattern may be different per MBS service, which may be not aligned with the unicast traffic pattern. Moreover, if the UE in RRC_CONNECTED is restricted in the active time for the unicast service to monitor the PTM data transmission, it may not match the MBS service quality of service (QoS) mechanism. Additionally, if the network considers the MBS QoS requirement/traffic pattern when setting the DRX configuration, it may result in increased UE power usage since UE is required to monitor the unicast scheduling when the potential transmission is for the PTM MBS service. Therefore, new solutions related to DRX are needed.

Embodiments of the present disclosure propose a solution for DRX configurations for PTP and/or PTM transmissions. In this solution, a UE maintains separate DRX configurations for PTP transmissions and PTM transmissions. During active time for the PTP transmissions, the UE monitors PDCCH with a UE specific identifier. The UE monitors PDCCH with a PTM transmission specific identifier during active time for the PTM transmissions. In this way, it can match the MBS service QoS mechanism. Moreover, it also saves power at the UE.

Figure 2:
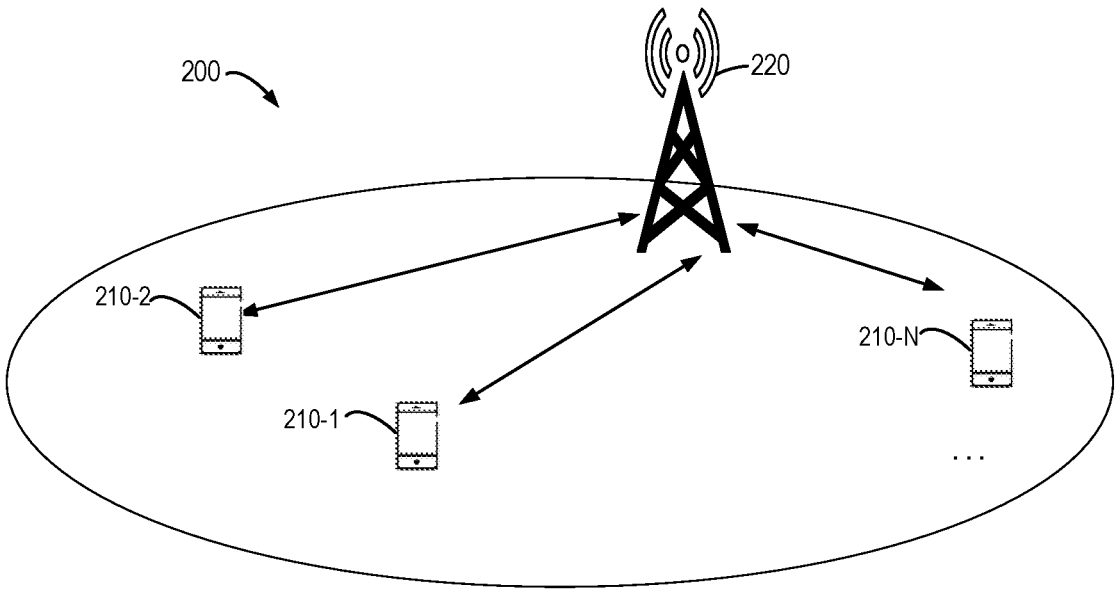
FIG. 2 shows an example communication network in which example embodiments of the present disclosure can be implemented.

Principles and implementations of the present disclosure will be described in detail below with reference to FIGS. 2-10. FIG. 2 shows an example communication network 200 in which embodiments of the present disclosure can be implemented. The network 200 includes a base station (BS) 220. The network 200 also comprises user equipment (UE) 210-1, UE 210-2, . . . , UE 210-N, which can be collectively referred to as "UE(s) 210." The UE 210 is served by the BS 220. The network 100 may provide one or more serving cells to serve the UE 210.

It is to be understood that the number of BSs 220, UEs 210 and serving cells is only for the purpose of illustration without suggesting any limitations. The network 200 may include any suitable number of BSs, UEs and serving cells adapted for implementing embodiments of the present disclosure.

In the communication network 200, the BS 220 can communicate data and control information to the UE 210 and the UE 210 can also communication data and control information to the BS 220. A link from the BS 220 to the UE 210 is referred to as a downlink (DL) or a forward link, while a link from the UE 210 to the BS 220 is referred to as an uplink (UL) or a reverse link.

Figure 3:
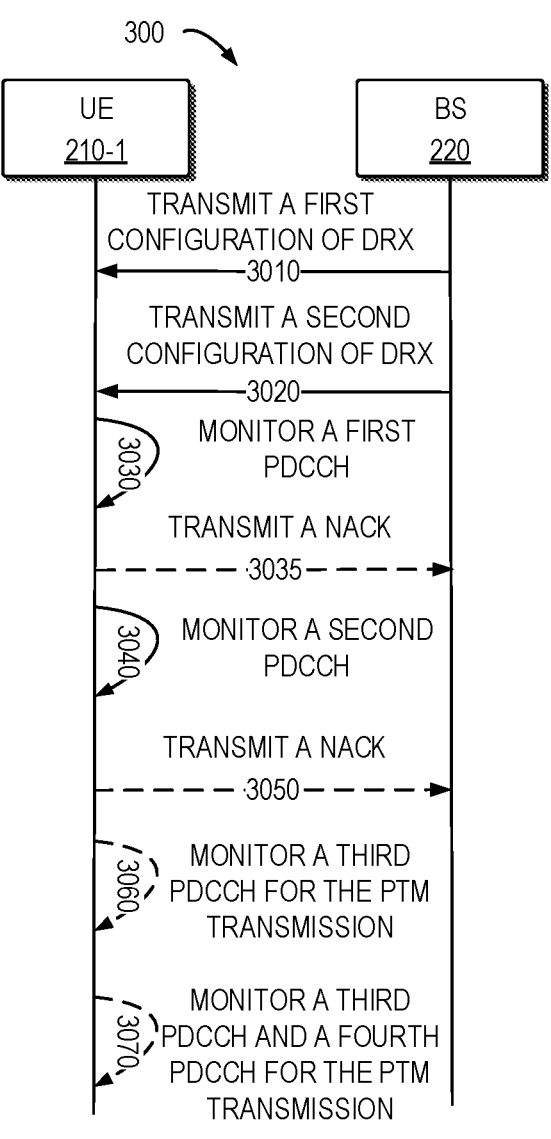
FIG. 3 illustrates a signaling flow for DRX transmissions where a UE maintains separate active time according to some example embodiments of the present disclosure.

Reference is now made to FIG. 3. FIG. 3 illustrates a signaling flow 300 for DRX transmissions where a UE maintains separate active time according to embodiments of the present disclosure. For the purpose of discussion, the signaling flow 300 will be described with reference to FIG.

2. Only for the purpose of illustrations, the signaling flow 300 may involve the UE 210-1 and the BS 220.

The BS 220 transmits (at 3010) a first configuration of DRX to the UE 210-1. For example, the first configuration of DRX can be transmitted via RRC signaling. Alternatively, the first configuration can be obtained from a system information block received by the UE 210-1. It should be noted that the first configuration can be transmitted via any proper signaling.

The UE 210-1 maintains a first active time for a PTP transmission based on the first configuration. The first configuration can comprise a DRX cycle for the PTP transmission. In some embodiments, the first configuration may comprise the long DRX cycle. In other embodiments, the first configuration may comprise the short DRX cycle. In an example embodiment, the first configuration can comprise both the long DRX cycle and the short DRX cycle.

Alternatively or in addition, the first configuration may comprise an on-duration timer for the PTP transmission. In some embodiments, the first configuration can comprise an inactivity timer for the PTP transmission. In other embodiments, the first configuration may comprise a hybrid automatic repeat request (HARQ) round trip time (RTT) timer for the PTP transmission. Additionally, a retransmission timer for the PTP transmission may be included in the first configuration. The term "HARQ RTT timer" used herein refer to a timer indicating a duration (for example, the minimum number of subframe(s)) before a HARQ retransmission is expected. While HARQ RTT timer is running, UE need not monitor PDCCH. At HARQ RTT timer expiry, the UE resumes PDCCH reception.

In some example embodiments, the first configuration can also comprise an identity of the UE 210-1. The identity can be any suitable identities that can be used to identify the UE 210-1.

In an example embodiment, the first configuration can comprise DRX related parameters for the PTP transmission. In some embodiments, the first configuration can comprise a start time of an on-duration implemented by the UE 210-1 for the PTP transmission. Alternatively or in addition, a length of the on-duration of the UE 210-1 for the PTP transmission can also be included in the first configuration.

In other example embodiments, the first configuration can comprise both a start time and an end time associated with an inactive-duration of a DRX cycle for the PTP transmission. In some embodiments, the inactive-duration can comprise one or more off-durations and one or more time durations of one or more active timers which can control the UE 210-1 not to receive.

Alternatively, the first configuration can comprise the start time of active time for the PTP transmission and a length of the active time. As another example embodiment, the first configuration can comprise a start time of an inactive-duration of a DRX cycle for the PTP transmission and a length of the inactive-duration for the PTP transmission.

The BS 220 transmits (at 3020) a second configuration of DRX to the UE 210-1. For example, the second configuration of DRX can be transmitted via a RRC signaling. Alternatively, the second configuration can be obtained from a system information block received by the UE 210-1. It should be noted that the second configuration can be transmitted via any proper signaling.

The UE 210-1 maintains a second active time for a PTM transmission based on the second configuration. The second configuration can comprise a DRX cycle for the PTM transmission. In some embodiments, the second configuration may comprise the long DRX cycle. In other embodiments, the second configuration may comprise the short DRX cycle. In an example embodiment, the second configuration can comprise both the long DRX cycle and the short DRX cycle.

Alternatively or in addition, the second configuration may comprise an on-duration timer for the PTM transmission. In some embodiments, the second configuration can comprise an inactivity timer for the PTM transmission. In other embodiments, the second configuration may comprise a HARQ RTT timer for the PTM transmission. Additionally, a retransmission timer for the PTM transmission may be included in the second configuration.

In an example embodiment, the second configuration can comprise DRX related parameters for the PTM transmission. In some embodiments, the second configuration can comprise a start time of an on-duration implemented by the UE 210-1 for the PTM transmission. Alternatively or in addition, a length of the on-duration of the UE 210-1 for the PTM transmission can also be included in the second configuration.

In other example embodiments, the second configuration can comprise both a start time and an end time associated with an inactive-duration of a DRX cycle for the PTM transmission. In some embodiments, the inactive-duration can comprise one or more off-durations and one or more time durations of one or more active timers which can control the UE 210-1 not to receive.

Alternatively, the second configuration can comprise the start time of active time for the PTM transmission and a length of the active time. As another example embodiment, the second configuration can comprise a start time of an inactive-duration of a DRX cycle for the PTM transmission and a length of the inactive-duration for the PTM transmission.

The first and second configurations can be transmitted via the same signaling and/or signaling format. Alternatively, the first and second configurations can be transmitted via different signaling. In other embodiments, the first configuration and/or the second configuration may be configured at the UE.

In some embodiments, parameters in the first configuration may be same as parameters in the second configuration. In this case, the BS 220 may configure only one set parameters for the first and second configurations. For example, the DRX cycle, the on-duration timer, the inactivity time, the retransmission timer for the PTP transmission may be the same as those of the PTM transmission. Alternatively, one or more of the DRX cycle, the on-duration timer, the inactivity time, the retransmission timer may be different for the PTP transmission and the PTM transmission. For example, the HARQ RTT timer for the PTP transmission can be same as the HARQ RTT timer for the PTM transmission. Alternatively or in addition, the retransmission timer for the PTP transmission can be same as the retransmission timer for the PTM transmission. In this case, in some embodiments, the first configuration may comprise the HARQ RTT timer and the retransmission timer which are used for the PTP transmission and the PTM transmission, and the second configuration may not comprise the HARQ RTT timer and the retransmission timer. Alternatively, if the first configuration comprises the HARQ RTT timer and the retransmission timer for the PTP transmission and the second configuration comprises the HARQ RTT timer and the retransmission timer for the PTM transmission, values of the HARQ RTT timer and the retransmission timer for the PTP transmission can be the same as values of the HARQ RTT timer and the retransmission timer for the PTM transmission.

Figure 4:
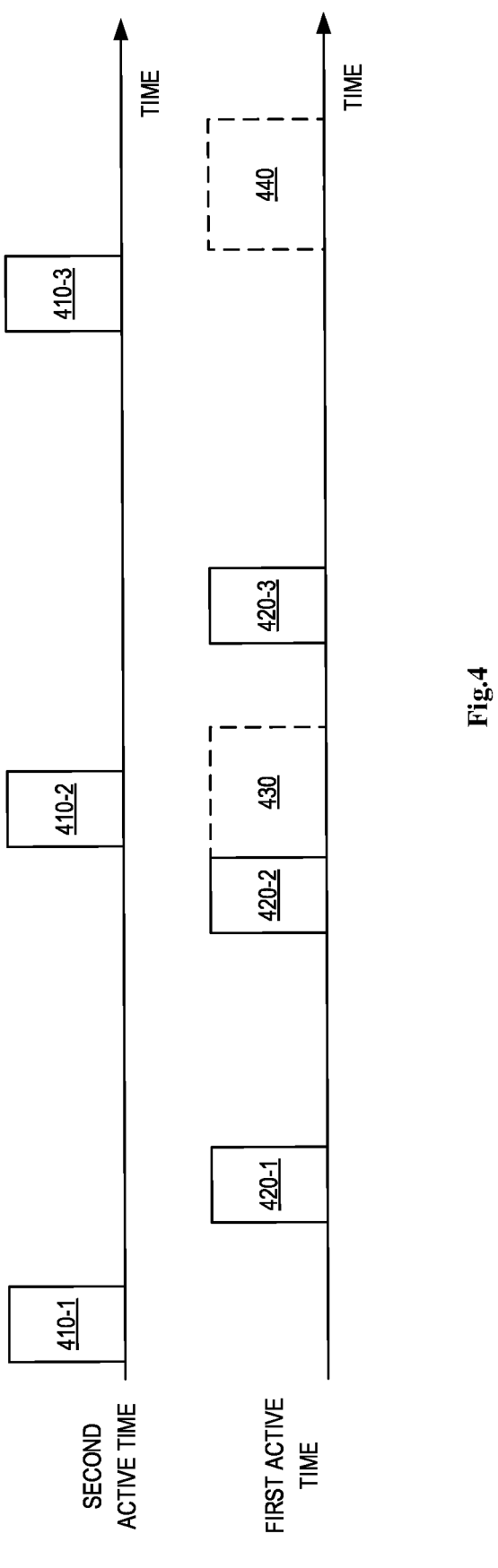
FIG. 4 illustrates a schematic diagram of example active time for a point-to-pint (PTP) transmission and example active time for a PTM transmission according to some example embodiments of the present disclosure.

The UE 210-1 monitors (at 3030) a first PDCCH with a first identifier specific to the UE 210-1 based on the first active time. For example, the first identifier can be a C-RNTI. Alternatively, the first identifier can be any other UE specific RNTIs which are related to the UE specific scheduling. It should be noted that the first identifier may be any identifier which is specific to the UE. For example, as shown in FIG. 4, durations 420-1, 420-2 and 420-3 belong to the first active time (i.e., PTP active time). The UE 210-1 can monitor (3030) the first PDCCH at the durations 420-1, 420-2 and 420-3. For example, if the UE 210-1 receives the first PDCCH within the duration 420-2 but fails to decode the first PDCCH, the UE 210-1 may transmit (at 3035) a NACK to the BS 220. In this case, the UE 210-1 may start the retransmission timer for the PTP transmission to monitor the retransmission after an expiration of the HARQ RRT timer. For example, the UE 210-1 may monitor the retransmission within the duration 430.

Figure 5:
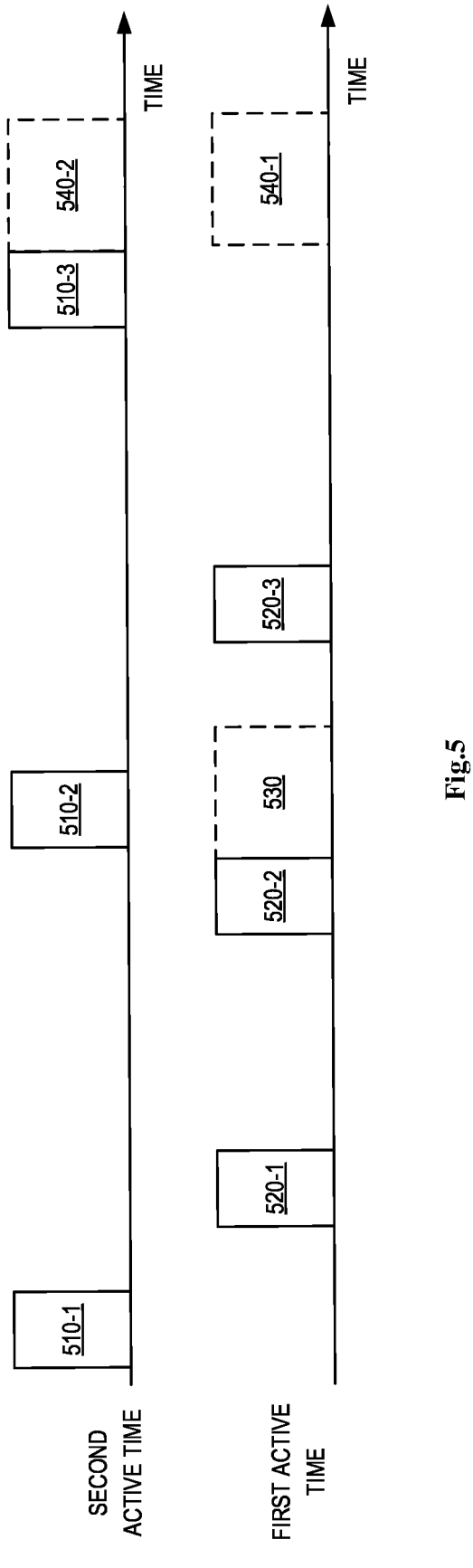
FIG. 5 illustrates a schematic diagram of other example active time for a PTP transmission and other example active time for a PTM transmission according to other example embodiments of the present disclosure.

As another example embodiment, as shown in FIG. 5, durations 520-1, 520-2 and 520-3 belong to the first active time (i.e., PTP active time). The UE 210-1 can monitor (at 3030) the first PDCCH at the durations 520-1, 520-2 and 520-3. For example, if the UE 210-1 receives the first PDCCH within the duration 520-2 but fails to decode the first PDCCH, the UE 210-1 may transmit 3035 a NACK to the BS 220. In this case, the UE 210-1 may start the retransmission timer for the PTP transmission to monitor the retransmission after an expiration of the HARQ RRT timer. For example, the UE 210-1 may only monitor the fifth PDCCH with the first identifier within the duration 530.

The UE 210-1 monitors (at 3040) a second PDCCH with a second identifier specific to the PTM transmission based on the second time active time. For example, the second identifier can be a G-RNTI. Alternatively, the second identifier may be other MBS group scheduling related RNTI. It should be noted that the first identifier may be any identifier which is specific to the UE.

In some embodiments, the UE 210-1 can maintain separate DRX configurations for the PTP transmission and the PTM transmission. Details of embodiments are given with the reference to FIG. 4. As illustrated in FIG. 4, durations 410-1, 410-2 and 410-3 belong to the second active time (i.e., PTM active time). The UE 210-1 can only monitor (at 3040) the second PDCCH with the identifier specific to the PTM transmission at the durations 410-1, 410-2 and 410-3. For example, if the UE 210-1 receives the second PDCCH within the duration 410-3 but fails to decode the second PDCCH, the UE 210-1 may transmit (at 3050) a NACK to the BS 220. In this case, the UE 210-1 may start the retransmission timer to monitor the retransmission after an expiration of the HARQ RRT timer. For example, the UE 210-1 may start a PTP HARQ RTT timer and the PTP retransmission timer. When the PTP retransmission timer starts, the UE 210-1 may enable the first active time. In this case, the UE 210-1 may monitor (at 3060) a third PDCCH with the first identifier within the duration 440. In this case, the third PDCCH can be same as the first PDCCH. In some embodiments, the UE 210-1 may also start a PTM HARQ RTT timer and the PTM retransmission timer and monitor the second PDCCH with the second identifier. In this way, it improves reliability and reduces latency of the PTM retransmission. Moreover, it can also save power at the UE.

Alternatively, the UE 210-1 can maintain separate DRX configurations for PTP and PTM new transmissions and maintain a common DRX configuration for PTP and PTM retransmissions. In some embodiments, the common DRC configuration may comprise one or more of the HARQ RTT timer or the retransmission timer. Details of embodiments are given with the reference to FIG. 5. As illustrated in FIG. 5, durations 510-1, 510-2 and 510-3 belong to the second active time (i.e., PTM active time). The UE 210-1 can only monitor (at 3040) the second PDCCH with the identifier specific to the PTM transmission at the durations 510-1, 510-2 and 510-3. For example, if the UE 210-1 receives the second PDCCH within the duration 510-3 but fails to decode the second PDCCH, the UE 210-1 may transmit 3050 a NACK to the BS 220. In this case, the UE 210-1 may start the retransmission timer which can be common to the PTP transmission and the PTM transmission to monitor the retransmission after an expiration of the HARQ RRT timer which can be common to the PTP and PTM transmissions. In this case, the UE 210-1 may monitor (at 3070) a third PDCCH with the first identifier and a fourth PDCCH with the second identifier for the PTM retransmission within the duration 540-1 and the duration 540-2. In this case, the third PDCCH can be same as the first PDCCH and the fourth PDCCH can be the same as the second PDCCH. In this way, it improves reliability and reduces latency of the PTM retransmission.

Figure 6:
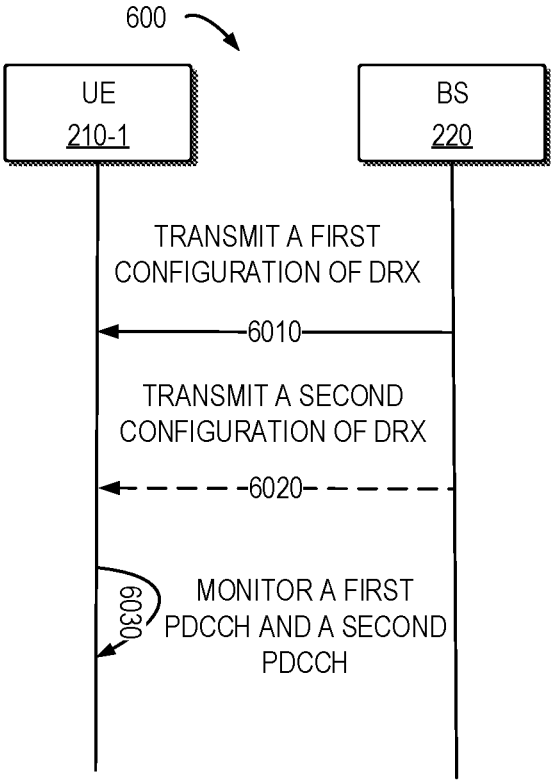
FIG. 6 illustrates a signaling flow for DRX transmissions where a UE maintains common active time according to some example embodiments of the present disclosure.

Reference is now made to FIG. 6. FIG. 6 illustrates a signaling flow for DRX transmissions where a UE maintains common active time according to embodiments of the present disclosure. For the purpose of discussion, the signaling flow 600 will be described with reference to FIG. 2. Only for the purpose of illustrations, the signaling flow 600 may involve the UE 210-1 and the BS 220.

The BS 220 transmits (at 6010) a first configuration of DRX to the UE 210-1. For example, the first configuration of DRX can be transmitted via a RRC signaling. It should be noted that the first configuration can be transmitted via any proper signaling.

In some embodiments, the UE 210-1 can maintain a first common active time for both a PTP transmission and a PTM transmission based on first configuration. In this case, the first configuration can also comprise a DRX cycle common for the PTP transmission and PTM transmission. In some embodiments, the first configuration may comprise the long DRX cycle. In other embodiments, the first configuration may comprise the short DRX cycle. In an example embodiment, the first configuration can comprise both the long DRX cycle and the short DRX cycle. Alternatively or in addition, the first configuration may comprise an on-duration timer common for the PTP transmission and PTM transmission. In some embodiments, the first configuration can comprise an inactivity timer common for the PTP transmission and PTM transmission. In other embodiments, the first configuration may comprise a HARQ RTT timer common for the PTP transmission and PTM transmission. Additionally, a retransmission timer common for the PTP transmission and PTM transmission may be included in the first configuration.

Figures 7A, 7B:
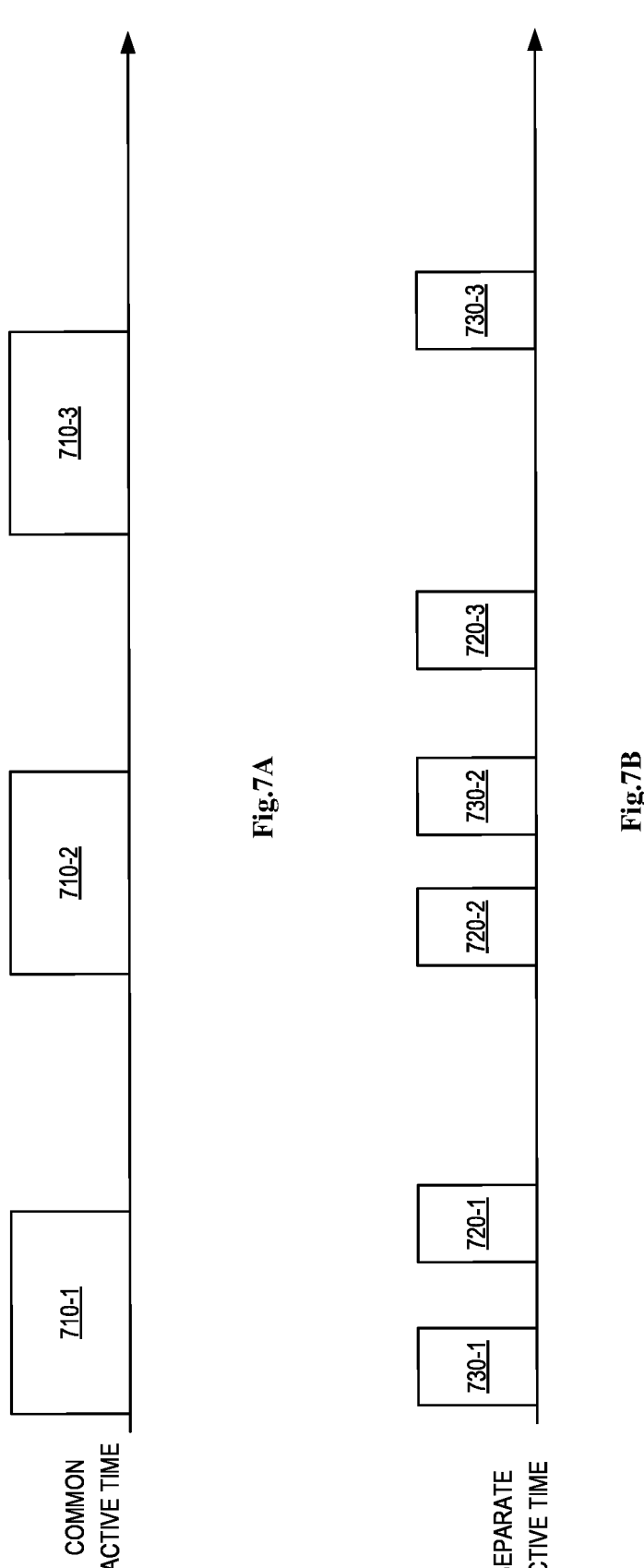
FIG. 7A illustrates a schematic diagram of common active time for the PTP transmission and the PTM transmission according to some example embodiments of the present disclosure.
FIG. 7B illustrates a schematic diagram of separate active time for the PTP transmission and the PTM transmission according to some example embodiments of the present disclosure.

Reference is now made to FIG. 7A. FIG. 7A illustrates a schematic diagram of common active time for the PTP transmission and the PTM transmission according to some embodiments of the present disclosure. As shown in FIG. 7A, durations 710-1, 710-2 and 710-3 belong to the first active time which is common for the PTP transmission and PTM transmission.

Alternatively, referring back to FIG. 6, the BS 220 may transmit (at 6020) a second configuration of DRX to the UE 210-1. The second configuration may comprise a second common active time for the PTP transmission and the PTM transmission.

In some embodiments, the first configuration can also comprise a DRX cycle for the PTP transmission. In some embodiments, the first configuration may comprise the long DRX cycle. In other embodiments, the first configuration may comprise the short DRX cycle. In an example embodiment, the first configuration can comprise both the long DRX cycle and the short DRX cycle. Alternatively or in addition, the first configuration may comprise an on-duration timer for the PTP transmission. In some embodiments, the first configuration can comprise an inactivity timer for the PTP transmission. In other embodiments, the first configuration may comprise a HARQ round RTT timer for the PTP transmission. Additionally, a retransmission timer for the PTP transmission may be included in the first configuration. Similarly, the second configuration can also comprise a DRX cycle for the PTM transmission. In some embodiments, the second configuration may comprise the long DRX cycle. In other embodiments, the second configuration may comprise the short DRX cycle. In an example embodiment, the second configuration can comprise both the long DRX cycle and the short DRX cycle. Alternatively or in addition, the second configuration may comprise an on-duration timer for the PTM transmission. In some embodiments, the second configuration can comprise an inactivity timer for the PTM transmission. In other embodiments, the second configuration may comprise a HARQ RTT timer for the PTM transmission. Additionally, a retransmission timer for the PTM transmission may be included in the second configuration.

Reference is now made to FIG. 7B. FIG. 7B illustrates a schematic diagram of active time for the PTP transmission and the PTM transmission according to some embodiments of the present disclosure. As shown in FIG. 7B, durations 720-1, 720-2 and 720-3 belong to the active time for the PTP transmission. Durations 730-1, 730-2 and 730-3 belong to the active time for the PTM transmission.

In some embodiments, the first and second configurations can be transmitted via the same signaling and/or signaling format. Alternatively, the first and second configurations can be transmitted via different signaling. In other embodiments, the first configuration and/or the second configuration may be configured at the UE.

Referring back to FIG. 6, the UE 210-1 monitors (at 6030) a first PDCCH with a first identifier specific to the UE 210-1 and a second PDCCH with a second identifier specific to the PTM transmission. For example, the first identifier can be a C-RNTI and the second identifier can be a G-RNTI. In this way, it improves reliability and reduces latency of the PTM retransmission.

As mentioned above, the first active time can be for both the PTP transmission and the PTM transmission. In this case, with the reference to FIG. 7A, the UE 210-1 may monitor the first PDCCH with the first identifier and the second PDCCH with the second identifier within the durations 710-1, 710-2 and 710-3.

Alternatively, as discussed previously, the first active time can be for the PTP transmission and the second active time can be for the PTM transmission. In this case, with the reference to FIG. 7B, the UE 210-1 may monitor the first PDCCH with the first identifier and the second PDCCH with the second identifier within the durations 720-1, 720-2, 720-3, 730-1, 730-2 and 730-3. In other words, the UE 210-1 may monitor the first PDCCH with the first identifier and the second PDCCH with the second identifier within combined active time.

Figure 8:
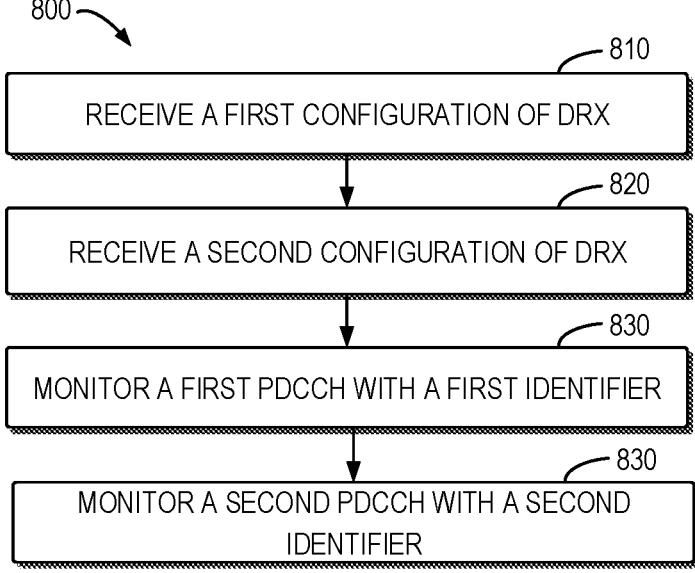
FIG. 8 illustrates a flowchart illustrating an example method for monitoring a physical downlink control channel (PDCCH) according to some example embodiments of the present disclosure.

FIG. 8 shows a flowchart of an example method 800 for monitoring a PDCCH in accordance with some embodiments of the present disclosure. The method 800 can be implemented at a device, for example the UE 210-1 shown in FIG. 2. It is to be understood that the method 800 may include additional blocks not shown and/or may omit some shown blocks, and the scope of the present disclosure is not limited in this regard.

At block 8010, the UE 210-1 receives a first configuration of DRX from the BS 220. The first configuration is for maintaining a first active time for a PTP transmission. For example, the first configuration of DRX can be transmitted via a RRC signaling. It should be noted that the first configuration can be transmitted via any proper signaling.

The first configuration can comprise a DRX cycle for the PTP transmission. In some embodiments, the first configuration may comprise the long DRX cycle. In other embodiments, the first configuration may comprise the short DRX cycle. In an example embodiment, the first configuration can comprise both the long DRX cycle and the short DRX cycle.

Alternatively or in addition, the first configuration may comprise an on-duration timer for the PTP transmission. In some embodiments, the first configuration can comprise an inactivity timer for the PTP transmission. In other embodiments, the first configuration may comprise a HARQ RTT timer for the PTP transmission. Additionally, a retransmission timer for the PTP transmission may be included in the first configuration.

At block 8020, the UE 210-1 receives a second configuration of DRX from the BS 220. The second configuration is for maintaining a second active time for a PTM transmission. For example, the second configuration of DRX can be transmitted via a RRC signaling. It should be noted that the second configuration can be transmitted via any proper signaling.

The second configuration can comprise a DRX cycle for the PTM transmission. In some embodiments, the second configuration may comprise the long DRX cycle. In other embodiments, the second configuration may comprise the short DRX cycle. In an example embodiment, the second configuration can comprise both the long DRX cycle and the short DRX cycle.

Alternatively or in addition, the second configuration may comprise an on-duration timer for the PTM transmission. In some embodiments, the second configuration can comprise an inactivity timer for the PTM transmission. In other embodiments, the second configuration may comprise a HARQ RTT timer for the PTM transmission. Additionally, a retransmission timer for the PTM transmission may be included in the second configuration.

The first and second configurations can be transmitted via the same signaling and/or signaling format. Alternatively, the first and second configurations can be transmitted via different signaling. In other embodiments, the first configuration and/or the second configuration may be configured at the UE.

In some embodiments, parameters in the first configuration may be same as parameters in the second configuration. In this case, the BS 220 may configure only one set parameters for the first and second configurations. For example, the DRX cycle, the on-duration timer, the inactivity time, the retransmission timer for the PTP transmission may be the same as those of the PTM transmission. Alternatively, one or more of the DRX cycle, the on-duration timer, the inactivity time, the retransmission timer may be different for the PTP transmission and the PTM transmission. For example, the HARQ RTT timer for the PTP transmission can be same as the HARQ RTT timer for the PTM transmission. Alternatively or in addition, the retransmission timer for the PTP transmission can be same as the retransmission timer for the PTM transmission. In this case, in some embodiments, the first configuration may comprise the HARQ RTT timer and the retransmission timer which are used for the PTP transmission and the PTM transmission, and the second configuration may not comprise the HARQ RTT timer and the retransmission timer. Alternatively, if the first configuration comprises the HARQ RTT timer and the retransmission timer for the PTP transmission and the second configuration comprises the HARQ RTT timer and the retransmission timer for the PTM transmission, values of the HARQ RTT timer and the retransmission timer for the PTP transmission can be the same as values of the HARQ RTT timer and the retransmission timer for the PTM transmission.

At block 8030, the UE 210-1 monitors a first PDCCH with a first identifier specific to the UE 210-1 based on the first time active time. For example, the first identifier can be a C-RNTI. Alternatively, the first identifier can be any other UE specific RNTIs which are related to the UE specific scheduling. It should be noted that the first identifier may be any identifier which is specific to the UE. The UE 210-1 may decode the first PDCCH. If the UE 210-1 fails to decode the first PDCCH, the UE 210-1 may transmit a NACK to the BS 220. In this case, the UE 210-1 may start the retransmission timer for the PTP transmission to monitor the retransmission after an expiration of the HARQ RRT timer. For example, the UE 210-1 may monitor the fifth PDCCH with the first identifier within a duration of a PTP retransmission timer.

At block 8040, the UE 210-1 monitors a second PDCCH with a second identifier specific to the PTM transmission based on the second time active time. For example, the second identifier can be a G-RNTI. Alternatively, the second identifier may be other MBS group scheduling related RNTI. It should be noted that the first identifier may be any identifier which is specific to the UE. The UE 210-1 may decode the second PDCCH. For example, if the UE 210-1 fails to decode the second PDCCH, the UE 210-1 may transmit a NACK to the BS 220. In this case, the UE 210-1 may start the retransmission timer to monitor the retransmission after an expiration of the HARQ RRT timer. For example, the UE 210-1 may start a PTP HARQ RTT timer and the PTP retransmission timer. When the PTP retransmission timer starts, the UE 210-1 may enable the first active time. In this case, the UE 210-1 may monitor a third PDCCH with the first identifier for the PTM retransmission within a duration of a PTM retransmission timer. In this case, the third PDCCH can be same as the first PDCCH. In some embodiments, the UE 210-1 may also start a PTM HARQ RTT timer and the PTM retransmission timer and monitor the second PDCCH with the second identifier. In this way, it improves reliability and reduces latency of the PTM retransmission. Moreover, it can also save power at the UE.

Alternatively, the UE 210-1 can maintain separate DRX configurations for PTP and PTM new transmissions and maintain a common DRX configuration for PTP and PTM retransmissions. In some embodiments, the common DRC configuration may comprise one or more of the HARQ RTT timer or the retransmission timer. For example, if the UE 210-1 fails to decode the second PDCCH, the UE 210-1 may transmit a NACK to the BS 220. In this case, the UE 210-1 may start the retransmission timer which can be common to the PTP transmission and the PTM transmission to monitor the retransmission after an expiration of the HARQ RRT timer which can be common to the PTP and PTM transmissions. In this case, the UE 210-1 may monitor 3070 a third PDCCH with the first identifier and a fourth PDCCH with the second identifier for the PTM retransmission within a duration of a PTM retransmission timer. In this case, the third PDCCH can be same as the first PDCCH and the fourth PDCCH can be the same as the second PDCCH. In this way, it improves reliability and reduces latency of the PTM retransmission.

Figure 9:
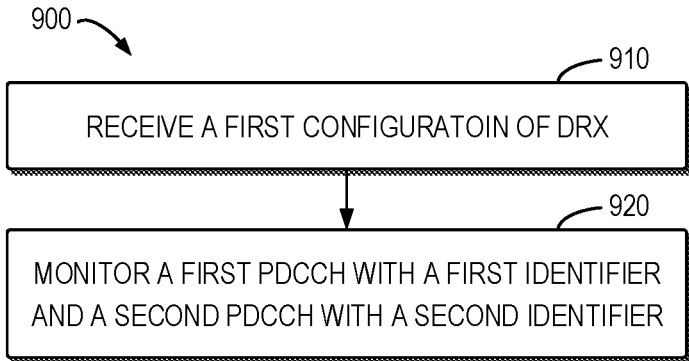
FIG. 9 illustrates a flowchart illustrating another example method for monitoring a PDCCH according to some other example embodiments of the present disclosure.

FIG. 9 shows a flowchart of an example method 900 for monitoring a PDCCH in accordance with some other embodiments of the present disclosure. The method 900 can be implemented at a device, for example the UE 210 shown in FIG. 2. It is to be understood that the method 900 may include additional blocks not shown and/or may omit some shown blocks, and the scope of the present disclosure is not limited in this regard.

At block 910, the UE 210-1 receives a first configuration of DRX from the BS 220. For example, the first configuration of DRX can be transmitted via a RRC signaling. It should be noted that the first configuration can be transmitted via any proper signaling.

In some embodiments, the UE 210-1 may maintain a first common active time for both a PTP transmission and a PTM transmission based on the first configuration. In this case, the first configuration can also comprise a DRX cycle common for the PTP transmission and PTM transmission. In some embodiments, the first configuration may comprise the long DRX cycle. In other embodiments, the first configuration may comprise the short DRX cycle. In an example embodiment, the first configuration can comprise both the long DRX cycle and the short DRX cycle. Alternatively or in addition, the first configuration may comprise an on-duration timer common for the PTP transmission and PTM transmission. In some embodiments, the first configuration can comprise an inactivity timer common for the PTP transmission and PTM transmission. In other embodiments, the first configuration may comprise a HARQ RTT timer common for the PTP transmission and PTM transmission. Additionally, a retransmission timer common for the PTP transmission and PTM transmission may be included in the first configuration.

Alternatively, the UE 210-1 may receive a second configuration of DRX from the BS 220. The UE 210-1 can maintain a second common active time for the PTP transmission and the PTM transmission based on the second configuration.

In some embodiments, the first configuration can also comprise a DRX cycle for the PTP transmission. In some embodiments, the first configuration may comprise the long DRX cycle. In other embodiments, the first configuration may comprise the short DRX cycle. In an example embodiment, the first configuration can comprise both the long DRX cycle and the short DRX cycle. Alternatively or in addition, the first configuration may comprise an on-duration timer for the PTP transmission. In some embodiments, the first configuration can comprise an inactivity timer for the PTP transmission. In other embodiments, the first configuration may comprise a HARQ RTT timer for the PTP transmission. Additionally, a retransmission timer for the PTP transmission may be included in the first configuration. Similarly, the second configuration can also comprise a DRX cycle for the PTM transmission. In some embodiments, the second configuration may comprise the long DRX cycle. In other embodiments, the second configuration may comprise the short DRX cycle. In an example embodiment, the second configuration can comprise both the long DRX cycle and the short DRX cycle. Alternatively or in addition, the second configuration may comprise an on-duration timer for the PTM transmission. In some embodiments, the second configuration can comprise an inactivity timer for the PTM transmission. In other embodiments, the second configuration may comprise a HARQ RTT timer for the PTM transmission. Additionally, a retransmission timer for the PTM transmission may be included in the second configuration.

In some embodiments, the first and second configurations can be transmitted via same signaling and/or signaling format. Alternatively, the first and second configurations can be transmitted via different signaling. In other embodiments, the first configuration and/or the second configuration may be configured at the UE.

At block 920, the UE 210-1 monitors a first PDCCH with a first identifier specific to the UE 210-1 and a second PDCCH with a second identifier specific to the PTM transmission. For example, the first identifier can be a C-RNTI and the second identifier can be a G-RNTI. In this way, it improves reliability and reduces latency of the PTM retransmission.

As mentioned above, the first common active time can be for both the PTP transmission and the PTM transmission. In this case, the UE 210-1 may monitor the first PDCCH with the first identifier and the second PDCCH with the second identifier within the first active time.

Alternatively, as discussed previously, the first active time can be for the PTP transmission and the second active time can be for the PTM transmission. In this case, the UE 210-1 may monitor the first PDCCH with the first identifier and the second PDCCH with the second identifier within the first and second active time. In other words, the UE 210-1 may monitor the first PDCCH with the first identifier and the second PDCCH with the second identifier within combined active time.

Figure 10:
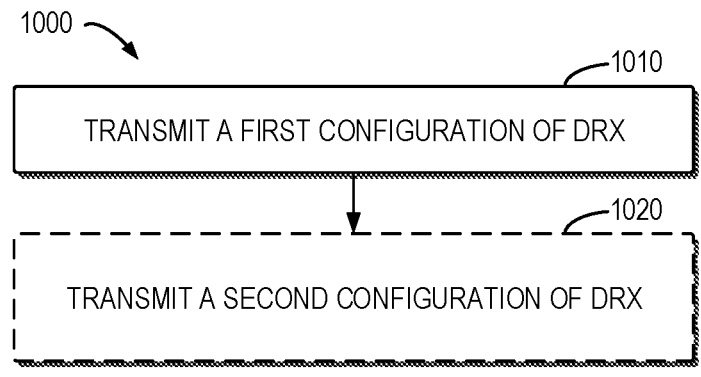
FIG. 10 illustrates a flowchart illustrating an example method for transmitting DRX configurations according to some example embodiments of the present disclosure.

FIG. 10 shows a flowchart of an example method 1000 for transmitting DRX configurations in accordance with some other embodiments of the present disclosure. The method 1000 can be implemented at a device, for example the BS 220 shown in FIG. 2. It is to be understood that the method 1000 may include additional blocks not shown and/or may omit some shown blocks, and the scope of the present disclosure is not limited in this regard.

At block 1010, the BS 220 transmits a first configuration of DRX to the UE 210-1. For example, the first configuration of DRX can be transmitted via a RRC signaling. It should be noted that the first configuration can be transmitted via any proper signaling.

In some embodiments, the first configuration can be used for maintaining a first active time for both a PTP transmission and a PTM transmission based the UE 210-1. In this case, the first configuration can comprise a DRX cycle common for the PTP transmission and PTM transmission. In some embodiments, the first configuration may comprise the long DRX cycle. In other embodiments, the first configuration may comprise the short DRX cycle. In an example embodiment, the first configuration can comprise both the long DRX cycle and the short DRX cycle. Alternatively or in addition, the first configuration may comprise an on-duration timer common for the PTP transmission and PTM transmission. In some embodiments, the first configuration can comprise an inactivity timer common for the PTP transmission and PTM transmission. In other embodiments, the first configuration may comprise a HARQ RTT timer common for the PTP transmission and PTM transmission. Additionally, a retransmission timer common for the PTP transmission and PTM transmission may be included in the first configuration.

Alternatively, the first configuration may be used for maintaining a first active time only for PTP transmission. In this case, at block 1020, the BS 220 may transmit a second configuration of DRX to the UE 210-1. The second configuration may comprise a second active time for a PTM transmission.

In some embodiments, the first configuration can also comprise a DRX cycle for the PTP transmission. In some embodiments, the first configuration may comprise the long DRX cycle. In other embodiments, the first configuration may comprise the short DRX cycle. In an example embodiment, the first configuration can comprise both the long DRX cycle and the short DRX cycle. Alternatively or in addition, the first configuration may comprise an on-duration timer for the PTP transmission. In some embodiments, the first configuration can comprise an inactivity timer for the PTP transmission. In other embodiments, the first configuration may comprise a HARQ round RTT timer for the PTP transmission. Additionally, a retransmission timer for the PTP transmission may be included in the first configuration. Similarly, the second configuration can also comprise a DRX cycle for the PTM transmission. In some embodiments, the second configuration may comprise the long DRX cycle. In other embodiments, the second configuration may comprise the short DRX cycle. In an example embodiment, the second configuration can comprise both the long DRX cycle and the short DRX cycle. Alternatively or in addition, the second configuration may comprise an on-duration timer for the PTM transmission. In some embodiments, the second configuration can comprise an inactivity timer for the PTM transmission. In other embodiments, the second configuration may comprise a HARQ RTT timer for the PTM transmission. Additionally, a retransmission timer for the PTM transmission may be included in the second configuration.

In some embodiments, the first and second configurations can be transmitted via same signaling and/or signaling format. Alternatively, the first and second configurations can be transmitted via different signaling. In other embodiments, the first configuration and/or the second configuration may be configured at the UE.

Figure 11:
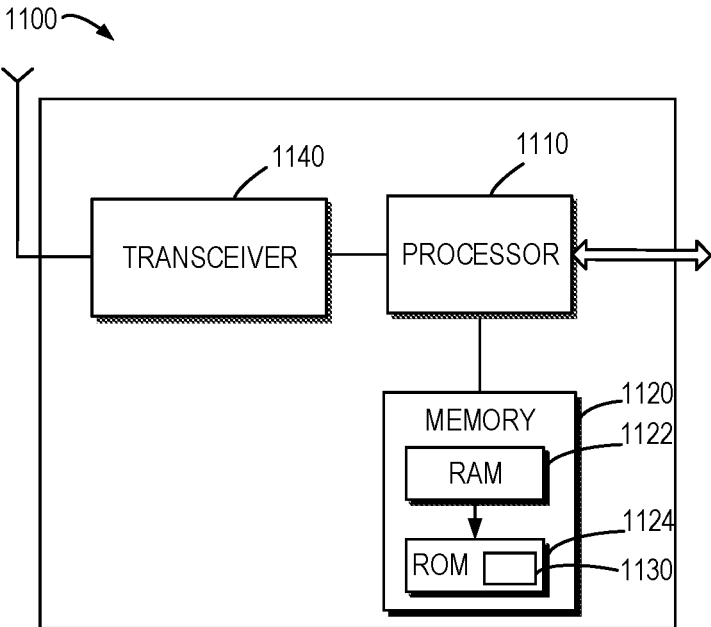
FIG. 11 illustrates a simplified block diagram of a device that is suitable for implementing embodiments of the present disclosure.

FIG. 11 is a simplified block diagram of a device 1100 that is suitable for implementing embodiments of the present disclosure. For example, the BS 220 and the UE 210 can be implemented by the device 1100. As shown, the device 1100 includes a processor 1110, a memory 1120 coupled to the processor 1110, and a transceiver 1140 coupled to the processor 1110.

The transceiver 1140 is for bidirectional communications. The transceiver 1140 is coupled to at least one antenna to facilitate communication. The transceiver 1140 can comprise a transmitter circuitry (e.g., associated with one or more transmit chains) and/or a receiver circuitry (e.g., associated with one or more receive chains). The transmitter circuitry and receiver circuitry can employ common circuit elements, distinct circuit elements, or a combination thereof.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

Embodiments of the present disclosure may be implemented by means of the program 1130 so that the device 1100 may perform any method of the disclosure as discussed with reference to FIGS. 3-10. The embodiments of the present disclosure may also be implemented by hardware or by a combination of software and hardware.

The present disclosure also provides at least one computer program product tangibly stored on a non-transitory computer readable storage medium. The computer program product includes computer-executable instructions, such as those included in program modules, being executed in a device on a target real or virtual processor, to carry out the method 800 as described above with reference to FIG. 8 and/or the method 900 as described above with reference to FIG. 9 and/or the method 1000 as described above with reference to FIG. 10.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A base station, comprising:
a transceiver configured to communicate with a user equipment (UE); and
a processor communicatively coupled to the transceiver and configured to perform operations comprising:
transmitting, to the UE in a system information block, a first common configuration of discontinuous reception (DRX) which is for maintaining a first active time for a point-to-point (PTP) transmission and point-to-multipoint (PTM) transmission, wherein the first common configuration further comprises a long DRX cycle and a short DRX cycle common to both the PTP transmission and PTM transmission, an on-duration timer common to both the PTP transmission and PTM transmission, an inactivity timer common to both the PTP transmission and PTM transmission, a hybrid automatic repeat request (HARQ) round trip time (RTT) timer common to both the PTP transmission and PTM transmission, and a retransmission timer common to both the PTP transmission and PTM transmission;
transmitting, to the UE, a second configuration of DRX which is for maintaining a second active time for the PTP transmission and the PTM transmission;
transmitting, to the UE, signals on a first physical downlink control channel (PDCCH) with a first identifier which is specific to the UE based on the first active time; and
transmitting, to the UE, signals on a second PDCCH with a second identifier which is specific to the PTM transmission based on the second active time.

2. The base station of claim 1, wherein the first identifier is a radio network temporary identifier (RNTI) which is related to a scheduling specific to the UE.

3. The base station of claim 1, wherein the second identifier is a radio network temporary identifier (RNTI) which is related to a Multicast and Broadcast Service (MBS) group scheduling.

4. The base station of claim 1, wherein the first common configuration comprises an on-duration timer for the PTP transmission and PTM transmission, an inactivity timer for the PTP transmission and PTM transmission, a hybrid automatic repeat request (HARQ) round trip time (RTT) timer for the PTP transmission and PTM transmission or a retransmission timer for the PTP transmission and PTM transmission.

5. The base station of claim 1, wherein the second configuration comprises an on-duration timer for the PTM transmission and PTP transmission, an inactivity timer for the PTM transmission and PTP transmission, a hybrid automatic repeat request (HARQ) round trip time (RTT) timer for the PTM transmission and PTP transmission or a retransmission timer for the PTM transmission and PTP transmission.

6. The base station of claim 1, wherein the first common configuration and the second configuration comprises an identity of the UE.

7. The base station of claim 1, wherein the first common configuration comprises (i) a start time of an on-duration for the PTP transmission and PTM transmission, (ii) a length of the on-duration for the PTP transmission and PTM transmission, (iii) an end time associated with an inactive-duration of a DRX cycle for the PTP transmission and PTM transmission, (iv) one or more time durations of one or more active timers, (v) a start time of active time for the PTP transmission and PTM transmission and a length of the active time, or (vi) a start time of the inactive-duration of the DRX cycle for the PTP transmission and PTM transmission and a length of the inactive-duration of the DRX cycle for the PTP transmission and PTM transmission.

8. The base station of claim 1, wherein the second configuration comprises (i) a start time of an on-duration for the PTM transmission and PTP transmission, (ii) a length of the on-duration for the PTM transmission and PTP transmission, (iii) an end time associated with an inactive-duration of a DRX cycle for the PTM transmission and PTP transmission, (iv) one or more time durations of one or more active timers, (v) a start time of active time for the PTM transmission and PTP transmission and a length of the active time, or (vi) a start time of the inactive-duration of the DRX cycle for the PTM transmission and PTP transmission and a length of the inactive-duration of the DRX cycle for the PTM transmission and PTP transmission.

9. A processor of a base station configured to perform operations comprising:
transmitting, to a user equipment (UE) in a system information block, a first common configuration of discontinuous reception (DRX) which is for maintaining a first active time for a point-to-point (PTP) transmission and point-to-multipoint (PTM) transmission, wherein the first common configuration comprises a long DRX cycle and a short DRX cycle-wherein the first common configuration further comprises a long DRX cycle and a short DRX cycle common to both the PTP transmission and PTM transmission, an on-duration timer common to both the PTP transmission and PTM transmission, an inactivity timer common to both the PTP transmission and PTM transmission, a hybrid automatic repeat request (HARQ) round trip time (RTT) timer common to both the PTP transmission and PTM transmission, and a retransmission timer common to both the PTP transmission and PTM transmission;
transmitting, to the UE, a second configuration of DRX which is for maintaining a second active time for the PTP transmission and the PTM transmission;
transmitting, to the UE, signals on a first physical downlink control channel (PDCCH) with a first identifier which is specific to the UE based on the first active time; and
transmitting, to the UE, signals on a second PDCCH with a second identifier which is specific to the PTM transmission based on the second active time.

10. The processor of claim 9, wherein the first identifier is a radio network temporary identifier (RNTI) which is related to a scheduling specific to the UE.

11. The processor of claim 9, wherein the second identifier is a radio network temporary identifier (RNTI) which is related to a Multicast and Broadcast Service (MBS) group scheduling.

12. The processor of claim 9, wherein the first common configuration comprises an on-duration timer for the PTP transmission and PTM transmission, an inactivity timer for the PTP transmission PTM transmission, a hybrid automatic repeat request (HARQ) round trip time (RTT) timer for the PTP transmission and PTM transmission or a retransmission timer for the PTP transmission and PTM transmission.

13. The processor of claim 9, wherein the second configuration comprises an on-duration timer for the PTM transmission and PTP transmission, an inactivity timer for the PTM transmission and PTP transmission, a hybrid automatic repeat request (HARQ) round trip time (RTT)

timer for the PTM transmission and PTP transmission or a retransmission timer for the PTM transmission and PTP transmission.

14. The processor of claim 9, wherein the first common configuration and the second configuration comprises an identity of the UE.

15. The processor of claim 9, wherein the first common configuration comprises (i) a start time of an on-duration for the PTP transmission and PTM transmission, (ii) a length of the on-duration for the PTP transmission and PTM transmission, (iii) an end time associated with an inactive-duration of a DRX cycle for the PTP transmission and PTM transmission, (iv) one or more time durations of one or more active timers, (v) a start time of active time for the PTP transmission and PTM transmission and a length of the active time, or (vi) a start time of the inactive-duration of the DRX cycle for the PTP transmission and PTM transmission and a length of the inactive-duration of the DRX cycle for the PTP transmission and PTM transmission.

16. The processor of claim 9, wherein the second configuration comprises (i) a start time of an on-duration for the PTM transmission PTP transmission, (ii) a length of the on-duration for the PTM transmission and PTP transmission, (iii) an end time associated with an inactive-duration of a DRX cycle for the PTM transmission and PTP transmission, (iv) one or more time durations of one or more active timers, (v) a start time of active time for the PTM transmission and PTP transmission and a length of the active time, or (vi) a start time of the inactive-duration of the DRX cycle for the PTM transmission and PTP transmission and a length of the inactive-duration of the DRX cycle for the PTM transmission and PTP transmission.

17. The base station of claim 2, wherein the first identifier is a C-RNTI.

18. The base station of claim 3, wherein the second identifier is a G-RNTI.

19. The processor of claim 10, wherein the first identifier is a C-RNTI.

20. The processor of claim 11, wherein the second identifier is a G-RNTI.

* * * * *